United States Patent [19]

Ihm

[11] 4,372,573
[45] Feb. 8, 1983

[54] DROP HITCH SYSTEM

[75] Inventor: Gerald J. Ihm, Dubuque, Iowa
[73] Assignee: Deere & Company, Moline, Ill.
[21] Appl. No.: 157,120
[22] Filed: Jun. 6, 1980
[51] Int. Cl.³ .............................................. B60D 7/02
[52] U.S. Cl. .................................... 280/477; 280/480
[58] Field of Search ................... 280/480, 491 F, 447, 280/477, 478 R; 114/251, 253, 254

[56] References Cited

U.S. PATENT DOCUMENTS

| 785,057 | 3/1905 | Stevenson | 280/477 X |
|---|---|---|---|
| 1,924,235 | 8/1933 | Fontaine | 280/477 |
| 2,306,231 | 12/1942 | Smith et al. | 280/480 X |
| 2,481,898 | 9/1949 | Bevan | 280/477 X |
| 3,526,289 | 9/1970 | Rodgers | 280/480 X |
| 3,951,435 | 4/1976 | Greatbach | 280/477 |
| 4,030,776 | 6/1977 | Bricknell et al. | 280/491 F X |
| 4,254,968 | 3/1981 | Del Vecchio | 280/477 |

FOREIGN PATENT DOCUMENTS

| 493769 | 6/1953 | Canada | 280/477 |
|---|---|---|---|
| 333238 | 2/1921 | Fed. Rep. of Germany | 280/477 |

Primary Examiner—Joseph Paul Brust

[57] ABSTRACT

A drop hitch system for a log skidder includes a pulley block which serves as part of the connection for connecting a towed implement to a cable wrapped about the drum of a winch provided on the skidder, and having a free end secured to a drop hitch frame secured to the rear end of the skidder. The pulley block is provided with stop structures for seating against a pair of upright cable guide rods provided on the drop hitch frame respectively rearwardly of a pair of upright cable guide rollers, when the towed implement is snubbed against the drop hitch frame.

5 Claims, 3 Drawing Figures

DROP HITCH SYSTEM

BACKGROUND OF THE INVENTION

The present invention relates to hitch systems and more particularly relates to drop hitch systems for use with log skidders.

Log skidders are equipped with a length of cable wrapped on a powered winch and trained over a roller mounted in an arch at the rear of the skidder. It is a known practice to provide such skidders with a drop hitch system which permits the cable to be used for towing implements behind the skidder. Such drop hitches include a drop hitch frame fixed to the rear end of the skidder at a location below the arch. The drop hitch frame serves to support a horizontal roller beneath which the cable is trained whereby a low line of action is established when the cable is connected to an implement for towing the same. Normally the cable is wound in to the point where a clevis connecting the cable to the implement is snubbed tightly against the drop hitch frame. Upon the skidder encountering terrain offering poor traction, the load may be "dropped" by releasing the winch drum brake to permit the cable to unwind while the vehicle is moved to a location offering better traction whereupon the winch drum is powered to wind in the cable and again bring the implement up adjacent to the drop hitch frame.

These prior art drop hitch systems have been found to suffer from one or more of the faults of their drop hitch frames including sharp edges which sever the cable, of having their cable guide rollers installed in the hitch frame such as to be vulnerable to being damaged by engagement with the towed implement hitch connection when the cable is winched in and of their hitch connections being designed such they do not engage the drop hitch frame in a properly aligned or centered manner when the cable is winched in.

SUMMARY OF THE INVENTION

According to the present invention, there is provided an improved drop hitch system.

It is a broad object of the invention to provide a drop hitch system which does not have any of the above noted faults of the prior art systems.

A more specific object is to provide a drop hitch system wherein the drop hitch frame is provided with a pair of laterally spaced, upright cylindrical rods which are respectively spaced rearwardly of a pair of upright cable guide rollers so as to protect the rollers from being engaged and possibly damaged by the towed implement hitch connection when the latter is winched in, the upright rods serving also to present a rounded surface for engagement by the winch cable so as to reduce cable damage.

Another specific object is to provide a drop hitch system wherein a pulley block is used as part of the implement hitch connection such as to reduce the towing force experienced by the cable to thereby increase cable life and to reduce the speed at which the implement is winched in to thereby make it easier for an operator to control the winching in of the implement to thereby reduce shock loads to the drop hitch frame.

Yet another object of the invention is to provide a drop hitch system including a pulley block as described in the preceding object and wherein the free end of the cable is connected to the drop hitch frame such that the cable acts to keep the pulley block properly oriented for centered engagement with the drop hitch frame when the cable is winched in.

A more specific object is to provide a drop hitch system including a pulley block as described in the previous objects but wherein a pair of stops are fixed to opposite faces of the pulley block for respectively engaging the upright rods when the cable is winched in.

Another specific object is to provide a drop hitch system including a drop hitch frame which may be inverted to dispose the horizontal cable guide roller, carried by the drop hitch frame, at a different vertical level to thereby provide a different line of action for the cable.

These and other objects will become apparent from a reading of the following description together with the appended drawings.

DESCRIPTION OF THE PREFERRED EMBODIMENT

Figure 1:
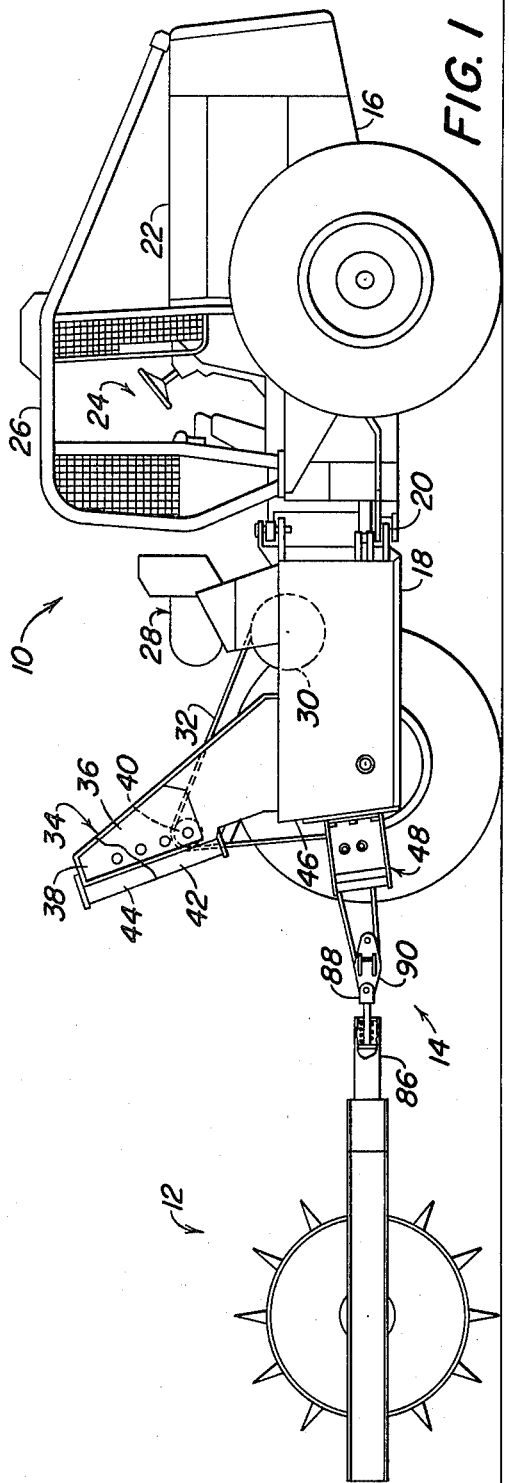
FIG. 1 is a right side elevational view of a log skidder connected to a rolling chopper by means of a drop hitch system constructed in accordance with the principles of the present invention, the hitch system being shown in its dropped condition.
Figure 3:
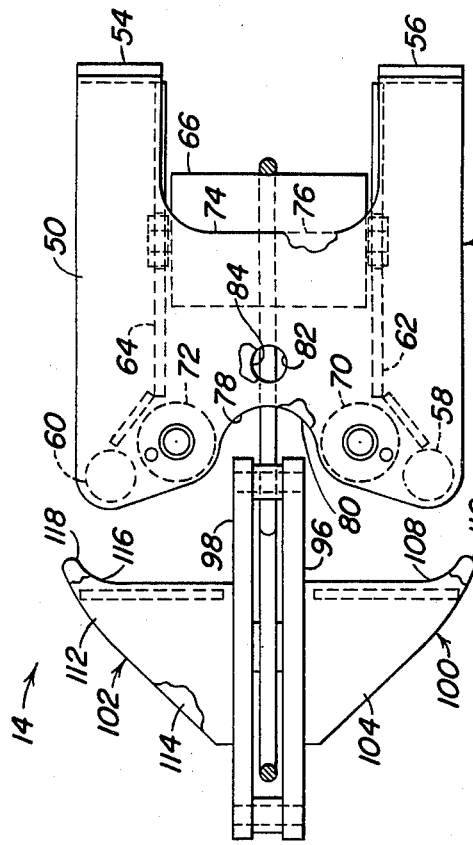
FIG. 3 is a top view taken along line 3—3 of the drop hitch system illustrated in FIG. 2.
Figure 2:
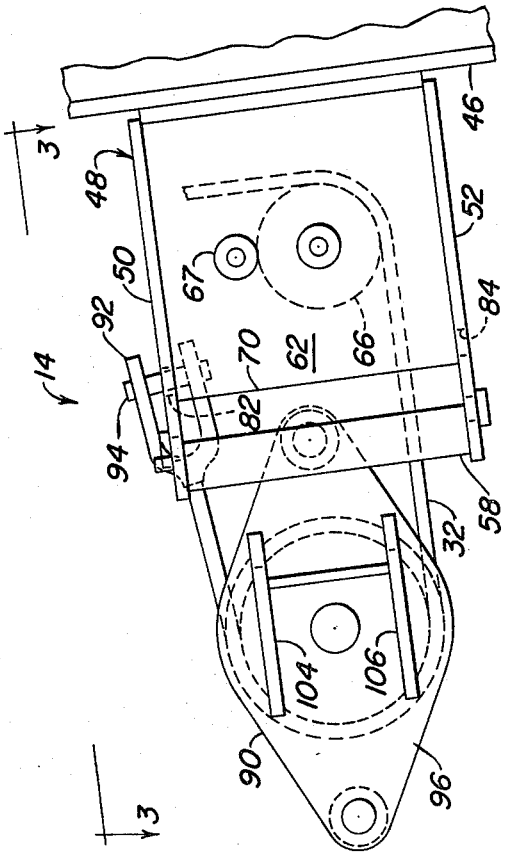
FIG. 2 is a right side elevational view of the drop hitch system shown with the pulley block adjacent its snubbed position.

Referring now to the drawings, FIG. 1 shows a log skidder 10 hitched to a rolling chopper 12 by means of a drop hitch system indicated in its entirety by the reference numeral 14.

The skidder 10 is representative of one type of tractor with which the drop hitch system 14 is particularly adapted for use and includes front and rear wheel-supported frame sections 16 and 18, respectively, pivotally interconnected by a vertical pivot assembly 20. The front frame section 16 carries an engine (not shown) located within an enclosure 22 and an operator's station 24 enclosed by a rollover protection stucture 26.

Mounted on the rear frame section 18 just rearwardly of the pivot assembly 20 is a winch 28 including a powered cable drum 30 having a length of cable 32 wrapped therearound. An arch structure 34 is fixed to an upper rear surface of the rear frame section 18 and includes laterally spaced right and left side members 36 and 38, respectively, having a horizontally disposed roller 40 located between and rotatably supported thereby and having right and left upright rollers 42 and 44 respectively, rotatably supported at rear edges thereof.

Fixed to a rearwardly facing rear end surface 46 of the frame section 18 is a drop hitch frame 48 which forms part of the drop hitch system 14. The hitch frame 48 comprises spaced, parallel, substantially identical upper and lower plates 50 and 52, respectively, having an upright mounting strap 54 joining the forward right corners of the plates 50 and 52 and an upright mounting strap 56 joining the forward left corners of the plates. Fixed between the plates 50 and 52 so as to form right and left corners of the hitch frame 48 are right and left upright corner rods 58 and 60, respectively. Right and left rectangular parallel side plates 62 and 64, respectively, extend between and are joined to the upper and lower plates 50 and 52. Extending between the plates 62 and 64 and having opposite ends rotatably supported therein is a horizontal roller 66 which is located slightly rearwardly of the arch-supported roller 40. Above the roller 66, as at 67, are alternate mounting holes for the roller 66. These holes are closer to the upper plate 50 that the holes in which the roller 66 is shown are spaced from the lower plate 52 whereby the roller 66 may be disposed at four different levels, two with the hitch frame as shown and two with the hitch frame inverted, to thereby establish different pulling point levels so as to accommodate the hitch frame to different towed implements as will be more apparent after reading the remainder of the description. Mounted between the upper and lower plates 50 and 52 at transversely spaced locations respectively inwardly and slightly forwardly of the corner rods 58 and 60 are upright rollers 70 and 72. The forward edges of the plates 50 and 52 are provided with centrally located cut-outs 74 and 76, respectively, which extend rearwardly to a location almost as far rearwardly as the axis of the roller 66. The rear edges of the plates 50 and 52 are similarly provided with central cut-outs 78 and 80 which extend forwardly between the upright rollers 70 and 72. Respectively spaced forwardly from the cut-outs 78 and 80 are clevis mounting holes 82 and 84.

The cable 32 extends over the arch-supported roller 40, then downwardly through the cut-out 74 and then rearwardly beneath the horizontal roller 66 and between the upright rollers 70 and 72. The rolling chopper 12 includes a forwardly extending tongue 86 having a swivel-clevis 88 connected thereto and to a pulley block 90. The cable 32 passes around the pulley block 90 and has a clevis 92 joined to its free end. The clevis 92 is releasably secured to the hitch frame 48 at the upper clevis mounting hole 82 by a pin 94. Thus, it will be appreciated that when the cable 32 is winched in the pulley block 90 will be advanced towards the hitch frame 48. In order to prevent the pulley block 90 from being drawn into the frame 48, opposite side plates 96 and 98 of the block 90 are respectively provided with stops 100 and 102. The stop 100 comprises spaced upper and lower generally triangular plates 104 and 106 each having one edge welded to the plate 96. Outer forward corners of the plates 104 and 106 are respectively formed to define arcuate receptacles 108 and 110 for receiving the right corner rod 58. Similarly, the stop 102 comprises spaced upper and lower generally triangular plates 112 and 114 each having one edge welded to the plate 98 and respectively having outer forward corners formed to define arcuate receptacles 116 and 118 for receiving the left corner rod 60.

The operation of the invention is thought to be understood from the preceding description, suffice it to say that the tension in the cable 32 will act to maintain the pulley block 90 in an upright attitude during retrieval of a towed implement so that the stops 100 and 102 will be properly arranged to center the block 90 against the hitch frame 48, and the pulley block 90 will act to reduce the force experienced by the cable and the speed at which the implement is retrieved by a factor of two over what it would be if the end of the cable 32 were connected directly to the implement hitch.

I claim:

1. In combination with a log skidder including a main frame having a cable winch mounted thereon and wrapped with a length of cable, a drop hitch system, comprising: a drop hitch frame releasably secured to the rear of the skidder and including top, bottom and opposite side walls joined together to define a hollow enclosure opening towards the rear; a horizontal roller extending between and being rotatably supported by the opposite side walls; said top wall having an opening therein forwardly of the horizontal roller for receiving the cable, a pair of upright cable guide means mounted between the top and bottom walls and forming respective rear portions of the opposite side walls; a pulley block having side plates disposed on opposite sides of and rotatably supporting a cable pulley; said plates defining a clevis connection; said cable extending through the opening in the top wall, beneath the roller, about the cable pulley and having a free end anchored to the drop hitch frame at a location spaced equidistant from the upright cable guide means.

2. The combination defined in claim 1 wherein the pair of upright cable guide means comprises a pair of upright rods respectively located rearwardly of a pair of upright cable guide rollers.

3. The combination defined in claim 2 wherein the pulley block includes a pair of stop structures respectively secured to opposite faces of the pulley block for engaging the upright rods when the cable is winched in.

4. The combination defined in claim 3 wherein the pair of stop structures each include a pair of vertically spaced substantially triangular plates having one edge fixed to the pulley block and having forward corners spaced outwardly from the pulley block and configured to define a complimentary seat for one of the upright rods.

5. The combination defined in claim 1 wherein the horizontal roller is located closer to one than the other of the top and bottom walls; and the bottom wall having a centrally located cutout forwardly of the horizontal roller whereby the drop hitch frame may be inverted to change the level of the line of action of the cable to accommodate different implements to be towed.

* * * * *